US010908813B2

(12) United States Patent
Schaefer et al.

(10) Patent No.: US 10,908,813 B2
(45) Date of Patent: Feb. 2, 2021

(54) METHOD, COMPUTER PROGRAM PRODUCT AND DEVICE FOR DETERMINING INPUT REGIONS ON A GRAPHICAL USER INTERFACE

(71) Applicant: e.solutions GmbH, Ingolstadt (DE)

(72) Inventors: Henry Schaefer, Erlangen (DE);
Tobias Rupprecht, Nuremberg (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 129 days.

(21) Appl. No.: 15/876,922

(22) Filed: Jan. 22, 2018

(65) Prior Publication Data
US 2018/0210645 A1    Jul. 26, 2018

(30) Foreign Application Priority Data

Jan. 23, 2017    (DE) .................... 10 2017 000 569

(51) Int. Cl.
*G06F 3/0488*    (2013.01)
*G06F 3/0484*    (2013.01)
(Continued)

(52) U.S. Cl.
CPC .......... *G06F 3/04886* (2013.01); *B60K 37/06* (2013.01); *G06F 3/0412* (2013.01); *G06F 3/04842* (2013.01); *G06F 9/451* (2018.02); *B60K 2370/11* (2019.05); *B60K 2370/115* (2019.05); *B60K 2370/1438* (2019.05); *B60K 2370/1442* (2019.05)

(58) Field of Classification Search
CPC ............... G06F 3/04886; G06F 3/0482; G06F 3/04842; G06F 9/451
See application file for complete search history.

(56) References Cited

U.S. PATENT DOCUMENTS 5,436,637 A * 7/1995 Gayraud ............... G06F 3/0481
715/705
5,651,107 A * 7/1997 Frank .................... G06F 3/0481
345/589
(Continued)

OTHER PUBLICATIONS

Hanukaev, "Hit-Testing in iOS," Apr. 22, 2014, http://smnh.me/hit-testing-in-ios/.*
(Continued)

*Primary Examiner* — Ryan Barrett
(74) *Attorney, Agent, or Firm* — Tarolli, Sundheim, Covell & Tummino LLP

(57) ABSTRACT

A method and device are described for determining input regions that are affected by a user input at a graphical user interface, GUI. For each input region, the following are associated with one another: (i) an actuation level of the input region, (ii) an allocation of the input region to a region of the GUI, and (iii) a blocking type of the input region. The method includes detecting a user input, wherein the user input is allocated an input position on the GUI. The method additionally includes determining at least one input region that contains the input position. Finally, the method includes evaluating the blocking type allocated to that input region in order to determine whether the user input to at least one lower-ranking input region that contains the input position is blocked.

19 Claims, 8 Drawing Sheets

(51) Int. Cl.
*G06F 9/451* (2018.01)
*G06F 3/041* (2006.01)
*B60K 37/06* (2006.01)

(56) References Cited

U.S. PATENT DOCUMENTS

| | | | | |
|---|---|---|---|---|
| 6,147,684 | A * | 11/2000 | Nielsen | G06F 3/011 |
| | | | | 715/788 |
| 6,654,947 | B1 * | 11/2003 | North | G06F 9/451 |
| | | | | 717/101 |
| 6,670,970 | B1 * | 12/2003 | Bonura | G06F 3/0481 |
| | | | | 715/768 |
| 8,108,787 | B2 * | 1/2012 | Finger | G06F 9/542 |
| | | | | 715/766 |
| 2003/0210270 | A1 * | 11/2003 | Clow | G06F 3/04886 |
| | | | | 715/767 |
| 2004/0225960 | A1 * | 11/2004 | Parikh | G06F 9/451 |
| | | | | 715/243 |
| 2005/0125740 | A1 * | 6/2005 | Clow | G06F 3/0481 |
| | | | | 715/794 |
| 2005/0125741 | A1 * | 6/2005 | Clow | G06F 3/04886 |
| | | | | 715/794 |
| 2006/0132455 | A1 * | 6/2006 | Rimas-Ribikauskas | G06F 3/0414 |
| | | | | 345/173 |
| 2006/0242607 | A1 * | 10/2006 | Hudson | G06F 3/04817 |
| | | | | 715/863 |
| 2007/0240062 | A1 * | 10/2007 | Christena | G06F 3/04842 |
| | | | | 715/741 |
| 2008/0120568 | A1 * | 5/2008 | Jian | G06F 3/0346 |
| | | | | 715/781 |
| 2009/0217187 | A1 * | 8/2009 | Kendall | G06T 3/00 |
| | | | | 715/765 |
| 2010/0153871 | A1 * | 6/2010 | Yokoyama | G09B 29/106 |
| | | | | 715/768 |
| 2010/0315417 | A1 * | 12/2010 | Cho | G06F 1/1616 |
| | | | | 345/419 |
| 2011/0179368 | A1 * | 7/2011 | King | G06F 3/04815 |
| | | | | 715/769 |
| 2013/0104065 | A1 * | 4/2013 | Stecher | G06F 3/0481 |
| | | | | 715/767 |
| 2013/0222257 | A1 * | 8/2013 | Kwon | G06F 3/0412 |
| | | | | 345/169 |
| 2013/0298076 | A1 * | 11/2013 | Rice | G06F 3/0481 |
| | | | | 715/781 |
| 2014/0108915 | A1 * | 4/2014 | Lu | G06F 40/14 |
| | | | | 715/234 |
| 2014/0267169 | A1 * | 9/2014 | Mckiel, Jr. | G06F 3/0421 |
| | | | | 345/175 |
| 2014/0282272 | A1 * | 9/2014 | Kies | G06F 3/013 |
| | | | | 715/863 |
| 2014/0320440 | A1 | 10/2014 | Satake | |
| 2015/0128086 | A1 * | 5/2015 | Amerige | G06F 3/0482 |
| | | | | 715/781 |
| 2015/0339006 | A1 * | 11/2015 | Chaland | G06F 3/0482 |
| | | | | 715/835 |
| 2015/0339033 | A1 * | 11/2015 | Arnold | G06F 3/04842 |
| | | | | 715/854 |
| 2017/0277381 | A1 * | 9/2017 | Allyn | G06F 3/033 |
| 2019/0303215 | A1 * | 10/2019 | Marchiori | G06F 9/542 |

OTHER PUBLICATIONS

Ahmed, "Event Bubbling—Dealing with the child's parent," Aug. 18, 2014, https://kamranahmed.info/blog/2014/08/18/event-bubbling-and-how-can-it-be-prevented/.*

Skinner et al., "EaselJS Tutorial: Mouse Interaction," Jul. 15, 2014, https://web.archive.org/web/20140715031425/https://createjs.com/tutorials/Mouse%20Interaction/.*

German Search Report, Applicant: e.solutions GmbH; German Patent Application N. 10 2017 000 569.9, Filed Jan. 23, 2017; dated Sep. 13, 2017, 3 pgs.

* cited by examiner

| Input region ID | Actuation level | Blocking type (0 corresponds to non-blocking and 1 corresponds to blocking) | Allocation data | Process ID |
|---|---|---|---|---|
| 1 | 3 | 0 | 0,0 20,20 | 2 |
| 2 | 1 | 1 | 10,0 50,20 | 2 |
| 3 | 2 | 1 | 0,0 0,20 20,20 30,50 | 1 |
| 4 | 1 | 0 | 100,100 20,20 | 2 |
| 5 | 3 | 1 | 35,45 50,70 | 3 |
| ... | ... | ... | ... | ... |

Fig. 4

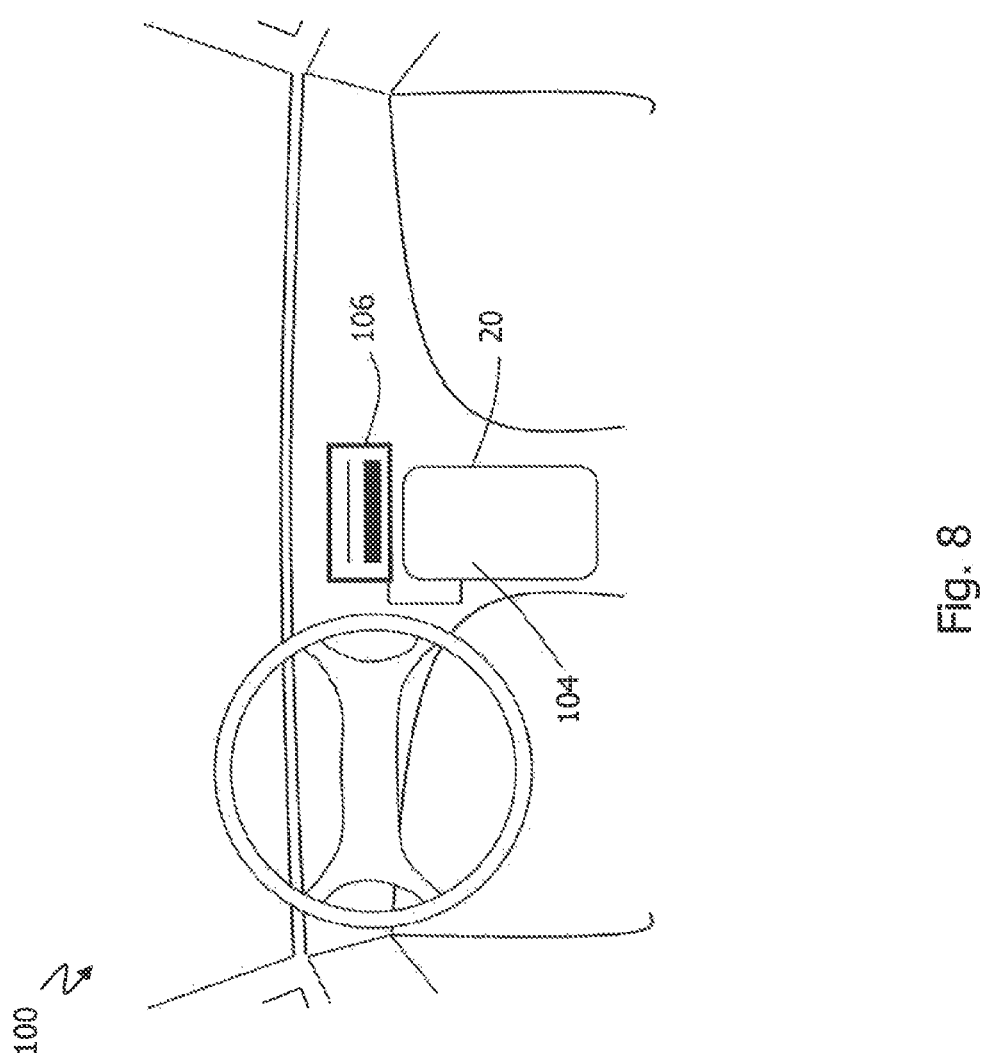

METHOD, COMPUTER PROGRAM PRODUCT AND DEVICE FOR DETERMINING INPUT REGIONS ON A GRAPHICAL USER INTERFACE

CROSS-REFERENCE TO RELATED APPLICATION

The present application claims priority under 35 U.S.C. § 119 from German Patent Application No. 10 2017 000 569.9, filed 23 Jan. 2017, and entitled METHOD, COMPUTER PROGRAM PRODUCT AND DEVICE FOR DETERMINING INPUT REGIONS ON A GRAPHICAL USER INTERFACE, which is incorporated herein by reference in its entirety.

TECHNICAL FIELD

The present disclosure relates generally to the field of human-machine interfaces. Specifically, the determination of input regions on a graphical user interface that are affected by user inputs is described. A corresponding computer program product and a corresponding device are further provided.

BACKGROUND

By means of a human-machine interface, HMI, a user is able to interact with a machine such as, for example, a processor-controlled device. Via the HMI, the user is able, for example, to control the device, to call up information or to intervene in processes in the device. A frequent implementation of a HMI comprises the displaying of a graphical user interface (GUI) on a display unit in combination with a position-sensitive input element (such as, for example, a computer mouse or a touch-sensitive surface), via which the user is able to enter inputs.

One or more application programs can usually run on an operating system of a processor-controlled device. Each of these application programs, and also the operating system itself, can evaluate user inputs in order to control a programmed process. Conventional operating systems and application programs are adapted to display a GUI having a plurality of input regions. When such input regions overlap, a user input in the overlapping region of the GUI is to be evaluated as an input by a single input region, a subset of the input regions or all of the input regions, as required.

FIG. 1 shows a display unit 10 having a GUI 12 which comprises a first actuation level 14 (dotted lines) and a second actuation level 18 (dashed lines). The first actuation level 14 comprises three input regions 16a, 16b and 16c. The second actuation level 18 comprises one input region 19. The GUI 12 displays input regions of the second actuation level 18 as a semi-transparent overlay over input regions of the first actuation level 14. The input region 16b hereby overlaps the input region 19. When a user input is made in the region of the middle input region 16b, both input regions 16b, 19 are to be affected by the input. Thus, for example, the input region 19 is to be faded out and a button of the input region 16b is to be actuated.

In general, user inputs are detected by a component that manages the inputs and forwards them to the programs allocated to the affected input regions (here input regions 16b, 19). However, when the input regions of the programs overlap, it must be determined which of the input regions is or are to be affected by the input.

For that purpose, the use of focused input regions (also called windows in this context) is known from the prior art. A particular window is hereby raised as the focused window. Inputs are forwarded only at this focused window. When a different window is to be used, it must first be raised as the focused window (e.g. by a separate user input) before use thereof is possible.

A further possibility is that all the programs receive all the inputs. However, when input regions overlap it must constantly be decided for which input region the user input was intended. Moreover, when a plurality of overlapping input regions are to evaluate an input as such, it must further be decided for which of the input regions the user input was intended.

SUMMARY

The object underlying the present disclosure is to improve the controllability of the functionality of input regions in connection with user inputs.

According to a first aspect there is provided a method for determining input regions that are affected by a user input at a graphical user interface, GUI. For each input region, the following are associated with one another: (i) an actuation level of the input region, wherein a plurality of actuation levels is defined in an order of ranking, (ii) an allocation of the input region to a region of the GUI, and (iii) a blocking type of the input region, which indicates whether a user input to a lower-ranking actuation level is blocked. The method comprises detecting a user input, wherein the user input is allocated an input position on the GUI. The method additionally comprises determining at least one input region that contains the input position. The method further comprises evaluating, at least for the highest-ranking determined input region, the blocking type allocated to that input region in order to determine whether the user input to at least one lower-ranking input region that contains the input position is blocked.

According to the present disclosure, a lower-ranking (higher-ranking) input region is an input region to which there is allocated an actuation level of higher (lower) rank compared with another input region. An input region may comprise a single or a plurality of pixels of the GUI. A shape of an input region may be defined by all or only by a part of the pixels that the input region comprises. An input region may cover a part of the GUI. Alternatively, an input region may cover the entire GUI.

A process can be allocated to each input region. A process can comprise a running program (including an operating system) or a routine of a running program. A plurality of input regions can be allocated to a particular process. Input regions of the same process can lie at different actuation levels. During the running time of a process, the process can open or close one or more input regions in a dynamic manner. Processes can also be opened and closed in a dynamic manner.

An input region opened by a process, at which an input can be made, subject to blocking by higher-ranking input regions, is also referred to hereinbelow as an active or registered input region. A running process is also referred to as an active process.

The method can comprise signaling the detected user input to one or more processes to which an input region affected by the user input is allocated. Whether an input region is affected by a user input or not typically depends on the position of the input region with respect to the input position and optionally on the blocking type of a higher-ranking input region.

A particular process can react to the user input signaled thereto (e.g. by closing or changing the input region allocated thereto which is affected by the user input or by performing particular operations). Alternatively, a particular process can discard the user input signaled thereto without reacting to it.

In one implementation, the method comprises signaling the user input to at least the process of the highest-ranking determined input region. The method can further comprise also signaling the user input to the process of at least one lower-ranking determined input region for which the user input is not blocked by a higher-ranking determined input region.

A first input region and a lower-ranking second input region can overlap at least partially (but also completely) on the GUI. In this case, at least one of the input regions (namely the lower-ranking input region) in the overlapping region may not be displayed or (e.g. where the higher-ranking input region is semi-transparent) may be displayed in a changed state as compared with its normal display form. Thus, for example, the first input region can be displayed in the overlapping region semi-transparently over the second input region. The input position can lie in the overlapping region.

According to a first variant, owing to the blocking type of the first input region, the user input to the lower-ranking actuation level may be not blocked. In this case, the user input can be signaled to the processes that are allocated to the first input region and the second input region.

According to another variant, owing to the blocking type of the first input region, the user input to the lower-ranking actuation level may be blocked. In this case, the user input can be signaled to the process that is allocated to the first input region and not signaled to the process that is allocated to the second input region.

The user input can be detected by means of a human-machine interface (HMI). For example, the user input can be detected on a touch-sensitive surface. The touch-sensitive surface can be part of a display unit on which the GUI is displayed. Alternatively, the user input can be detected by means of gesture recognition. Further HMI implementations for detecting the user input are also conceivable (e.g. by recognition of a mouse click or by means of finger tracking by a camera).

Each input region can be defined by coordinates which can clearly be allocated to coordinates of the GUI. In one variant, the coordinates in which the input regions are given correspond to the GUI coordinates. In another variant, there is a clear mapping rule (e.g. in the form of a coordinate transformation matrix). The coordinates can in each case be Cartesian coordinates, polar coordinates or other coordinates. The coordinates can described a geometric shape of each input region (such as, for example, a rectangle, a polygon, a circle or an ellipse).

In the steps of determining and/or evaluating (and optionally in alternative or further steps), a data structure can be used which, for each input region, associates its actuation level, allocation to a GUI region and blocking type with one another. The data structure can have the form of, for example, a table with rows and columns. In this case, a row of the table can be allocated to each input region. The table can further contain, for each input region, a column for each of the actuation level, the allocation to a GUI region and the blocking type. The sequence of the column entries can correspond to the ranking of the input regions.

In addition, the data structure, for each input region, can also associate the corresponding parameters (that is to say actuation level, allocation to a GUI region and blocking type) with a process allocated to the input region. In this manner, it is possible in the case of a user input determined for a particular input region to derive from the data structure the allocated process to which the user input (subject to blocking) is to be signaled.

In addition, the data structure can be continuously updated (e.g. during a running time of at least one process). Updating can take place in that, when a new input region is opened by an allocated process, the new input region is newly registered in the data structure and/or, when an input region registered in the data structure is closed by an allocated process (or when the allocated process is closed), the registered input region is erased from the data structure. The starting and/or closing of a process can be the consequence of a user input.

Continuous updating of the data structure is also possible to the effect that, during the running time of a particular process, parameter changes for an input region allocated to the process occur. Thus, for a registered input region, its actuation level, its shape (and thus its allocation to a GUI region) and/or its blocking type can change.

According to a second aspect there is provided a computer program product, wherein the computer program product has program code for carrying out the method presented herein when the program code is executed on a processor. The computer program product can further be stored on a storage medium that is readable by means of the processor. The data structure which, for each input region, associates its actuation level, allocation to a GUI region and blocking type with one another, can further be stored on the storage medium.

According to a third aspect there is provided a device for determining input regions that are affected by a user input at a GUI. For each input region, the following are associated with one another: (i) an actuation level of the input region, wherein a plurality of input regions is defined in an order of ranking, (ii) an allocation of the input region to a region of the GUI, and (iii) a blocking type of the input region, which indicates whether a user input to a lower-ranking actuation level is blocked. The device further comprises a processor which is adapted to detect a user input, wherein the user input is allocated an input position on the GUI. In addition, the processor is adapted to determine at least one input region that contains the input position. The processor is further adapted to evaluate, at least for the highest-ranking determined input region, the blocking type allocated to that input region, in order to determine whether the user input to at least one lower-ranking input region that contains the input position is blocked.

The device can further comprise a display unit which is adapted to display the GUI. In addition, the device can comprise a human-machine interface which is adapted to generate the user input.

BRIEF DESCRIPTION OF THE DRAWINGS

Further advantages, details and features of the present disclosure will become apparent from the following description of exemplary embodiments and from the figures, in which:

FIG. 4 shows an exemplary embodiment of a data structure in the form of a table;

FIG. 8 is an inside view of a motor vehicle having the device presented herein for determining input regions.

DETAILED DESCRIPTION

Figure 1:
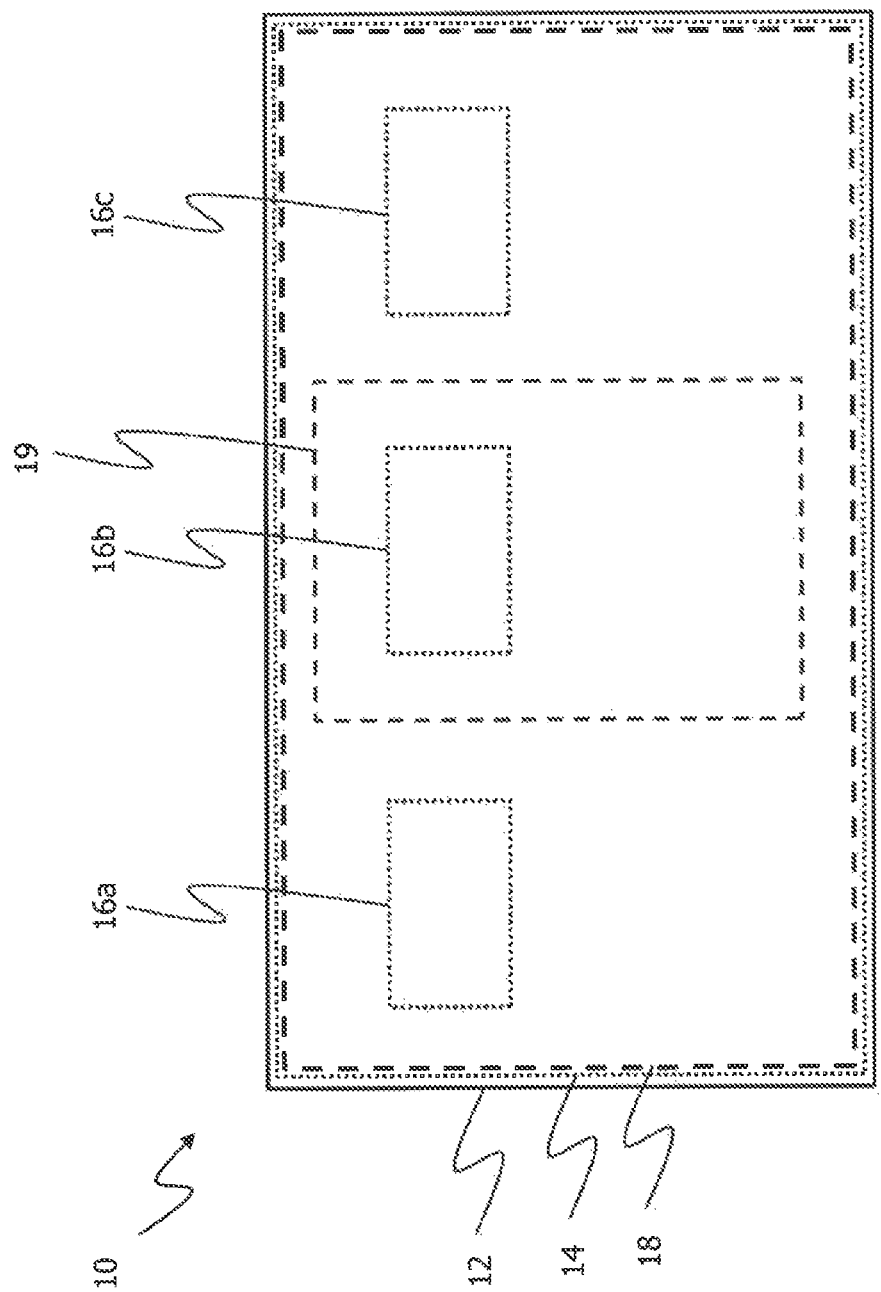
FIG. 1 is a schematic view of a GUI with overlapping input regions.

In the drawings, the same or similar elements are provided with corresponding reference numerals.

Figure 2:
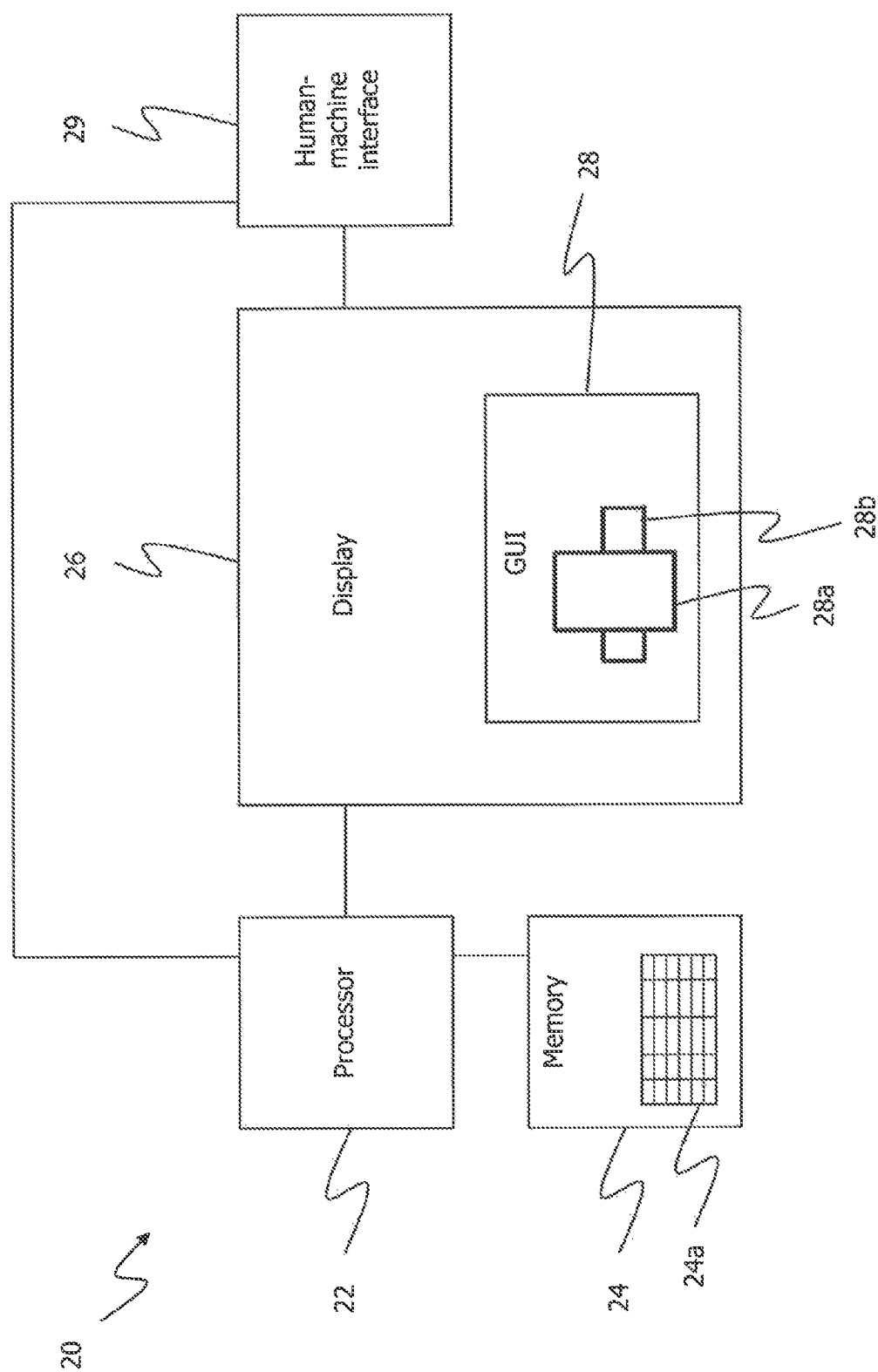
FIG. 2 is a schematic view of an exemplary embodiment of a device for determining input regions that are affected by a user input.

FIG. 2 is a schematic view of an exemplary embodiment of a device 20 for determining input regions that are affected by a user input.

The device 20 comprises at least one processor 22 and at least one memory 24 (e.g. a solid state memory or a hard disk) connected thereto. A computer program product with program code which can be executed by the processor 22 is stored in the memory 24.

According to FIG. 2, the device 20 further comprises a display unit 26 (e.g. an LCD or other screen) connected to the processor 22. The processor 22 is able to control the display unit 26 in order to display a graphical user interface (GUI) 28 thereon. The GUI 28 can in turn comprise one or more input regions 28a, 28b, etc. A process (e.g. an application program, an operating system program, a program routine, etc.) running on the processor 22 is allocated to each input region 28a, 28b. The input regions 28a, 28b can be in the form of buttons, sliders, spin controls, pop-ups (e.g. pop-ups which can be clicked away), windows (e.g. windows which can be clicked away), etc.

By means of a human-machine interface (HMI) 29 of the device 20, a user input can be made in each of the input regions 28a, 28b. Depending on the form of the HMI 29, the user input can be a touch input (when, for example, the display unit 26 is provided with a touch-sensitive surface) or a mouse click, a recognized gesture, etc.

There is further stored in the memory 24 a data structure 24a which, for each input region 28a, 28b registered in the data structure 24a, associates a plurality of parameters allocated to the particular input region 28a, 28b with one another.

These parameters include a first parameter which indicates an actuation level of the particular input region 28a, 28b. The actuation levels are defined in an order of ranking, so that an input region 28a can have the same, a higher or a lower rank as another input region 28b.

The parameters in the data structure 24a further include a second parameter which indicates an allocation of the particular input region 28a, 28b to a region of the GUI 28. For example, the second parameter can indicate the region of the GUI 28 at which the particular input region 28a, 28b is to be displayed. The second parameter can be given, for example, by a set of Cartesian coordinates.

The parameters in the data structure 24a additionally include a third parameter which specifies a blocking type of the particular input region 28a, 28b. The blocking type indicates whether a user input to a lower-ranking actuation level is blocked. In its simplest implementation, the blocking type is a binary parameter (yes/no), for example in the form of a flag. Of course, the blocking type can also assume more than two values, according to the implementation.

Figure 3:
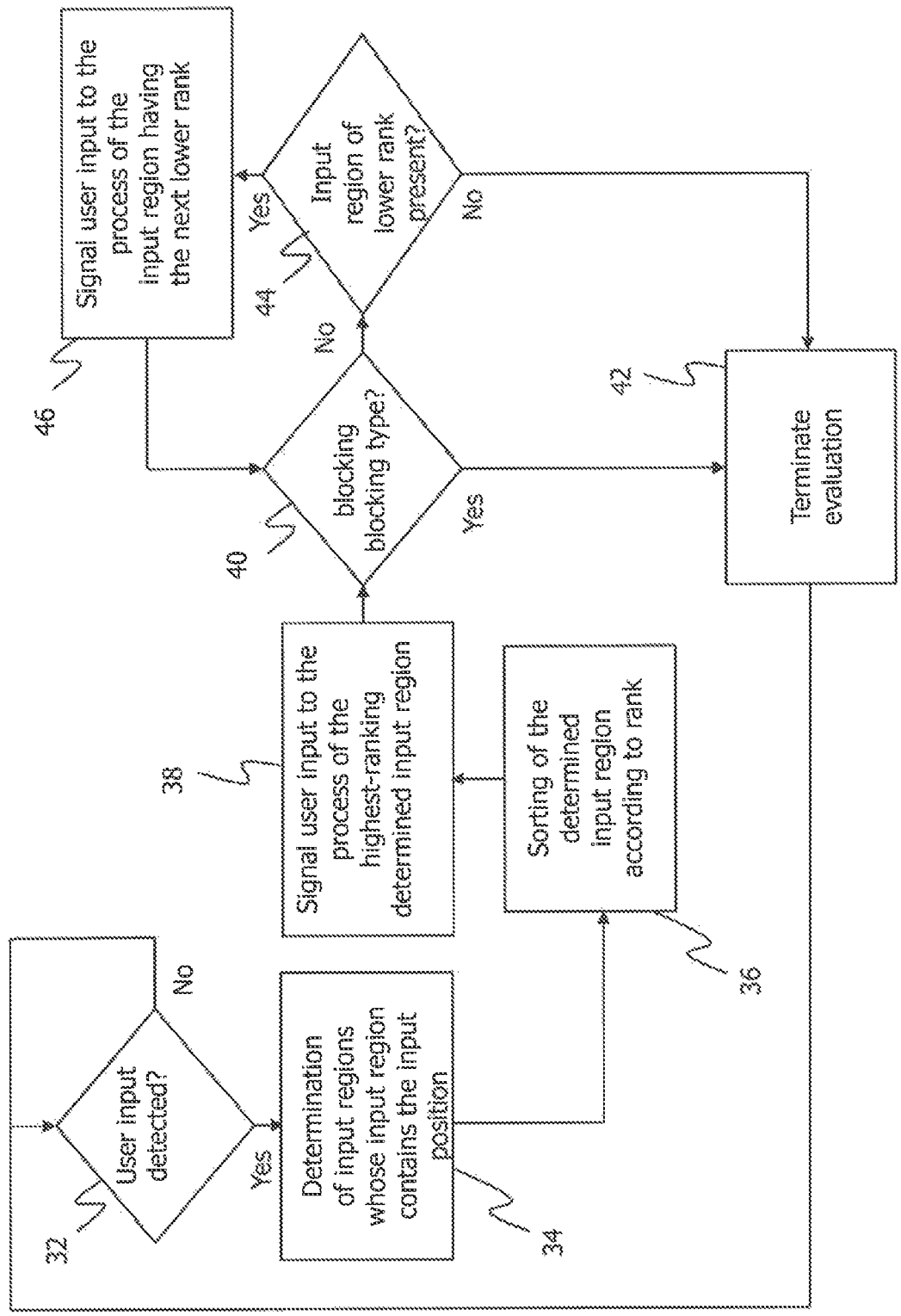
FIG. 3 is a flow diagram of a first exemplary embodiment of a method for determining input regions that are affected by a user input.

FIG. 3 shows a flow diagram 30 of a first exemplary embodiment of a method for determining input regions on a GUI that are affected by a user input. There is thereby allocated to each input region a process to which user inputs at the corresponding input region can be signaled.

The method according to FIG. 3 will be described hereinbelow with reference to the device 20 shown in FIG. 2. It will be appreciated that the method can also be carried out by a device having a different configuration.

In a step 32, the processor 22 continuously checks whether a user input made by means of the HMI 29 in relation to the GUI 28 can be detected. If a user input is detected in step 32, the user input is allocated an input position on the GUI 28. The input position can be given, for example, in the form of coordinates of a coordinate system of the GUI 28.

After a user input has been detected in step 32, the input regions 28a, 28b that contain the input position are determined in a subsequent step 34. To that end, the processor 22 compares the determined input position with the GUI regions which are given in the data structure 24a for all the input regions 28a, 28b registered in the data structure 24a. In the following, it is assumed, by way of example, that the two input regions 28a, 28b are registered in the data structure 24a, the (higher-ranking) input region 28a overlapping the (lower-ranking) input region 28b and the input position being in the overlapping region. If, on the other hand, the input position does not lie within either of the input regions 28a, 28b, the method can return to step 32 or otherwise react.

As explained above, the input regions 28a, 28b are allocated different actuation levels in the data structure 24a, wherein the actuation levels, and thus also the input regions 28a, 28b, are each allocated a rank. In a step 36, the input region or regions 28a, 28b determined in step 34 is/are sorted by the processor 22 in a list according to their rank. Since input region 28a has a higher rank than input region 28b, input region 28a forms the first entry in the list in the present example.

In a step 38, the processor 22 signals the user input to the process of the highest-ranking determined input region 28a (e.g. in the form of its coordinates and/or simply as a result). The processor 22 can determine the process allocated to the input region 28a from the data structure 24a, for example. The corresponding process then evaluates the user input signaled thereto and proceeds according to its process-specific circumstances. Thus, the user input signaled to the process may simply be discarded by the process or the process may perform a particular action.

In a step 40, the processor 22 then accesses the data structure 24a again and evaluates the allocated blocking type for the highest-ranking input region 28a which could be determined in step 34. It is hereby determined whether the user input to at least one lower-ranking input region that contains the input position (that is to say in this case to input region 28b according to FIG. 2) is blocked. If the blocking type is blocking, the user input cannot be applied to lower actuation levels. In this case, the processor 22 terminates the evaluation of the user input in a step 42 and returns to step 32.

However, if the blocking type of the determined highest-ranking input region is not blocking, then it is determined in a step 44 whether further, lower-ranking input regions could be determined in step 34. If no lower-ranking determined input regions are present, the evaluation of the user input is terminated in step 42 and the method returns to step 32.

However, if at least one further lower-ranking input region determined in step 34 is present (that is to say in this case input region 28*b*), the processor 22 signals the user input to the process of that input region in a step 46. The above-described data structure 24*a* can again be accessed in order to determine the corresponding process. Accordingly, if the user input was last signaled to the process of the highest-ranking input region 28*a*, then the user input is subsequently signaled to the process of the input region 28*b* with the second-highest rank, provided the highest-ranking input region 28*a* does not have blocking properties.

Then, in step 40, the blocking type allocated to the lower-ranking input region 28*b* is evaluated. If the blocking type is blocking, then the evaluation is terminated in step 42. However, if the blocking type is non-blocking, it is then determined in step 44 whether a lower-ranking input region was determined (that is to say an input region with a lower rank than input region 28*b*). If a lower-ranking input region again exists, steps 46, 40 and optionally step 44, if this input region does not have blocking properties, are again repeated for this input region.

As long as there are further lower-ranking input regions in the list according to step 36, which regions additionally do not have blocking properties, the loop with steps 46, 40 and 44 is continued. As soon as no further lower-ranking input regions are present and/or an input region has blocking properties, the loop and also the evaluation of the user input are terminated in step 42.

FIG. 4 shows a table of an exemplary embodiment of a data structure 24*a* in the form of a table, in which a plurality of input regions are registered. A row of the table is allocated to each active input region of an active process. The table has a column for each of the actuation level, the allocation to a GUI region and the blocking type. An optional column for a process ID is further provided.

In column 52, input region IDs are listed, which clearly identify each active input region.

In column 54, the actuation level allocated to an input region is given in each case. Since an actuation level can have a plurality of input regions, the same actuation level may be mentioned multiple times in column 54 in different rows.

In column 56, the blocking type of the corresponding input region is indicated. Since the blocking type in the present exemplary embodiment can only be either blocking or non-blocking, it is a binary parameter. The blocking type can thus be designated, for example, 0 for non-blocking and 1 for blocking.

In column 58, the allocation of an input region to a region of the GUI 28 is defined. The input regions are indicated by coordinates for a Cartesian coordinate system of the GUI 28. In the exemplary embodiment, the number of coordinate pairs defines a basic shape of the input region.

In FIG. 4, the input regions with the IDs 1, 2, 4 and 5 each have only two coordinate pairs. When only two coordinate pairs are given, the basic shape of the input region is a rectangle whose edges run parallel to the coordinate axes of the GUI 28. The first coordinate pair thereby denotes the coordinates of the vertex of the rectangle with the lowest coordinate values (for example, top left if the coordinate values increase to the right and downwards). The second coordinate pair denotes at the first position of the tuple the width and at the second position of the tuple the height of the rectangle. For the input region with ID 1 (see FIG. 4), the upper left corner of the rectangle is at the origin (0;0) of the coordinate system. With a height and width of in each case 20 units, the vertices of the rectangle thus lie at the coordinates (0;0), (20;0), (20;20) and (0;20).

If the number of coordinate pairs is greater than two, then the coordinates describe vertices of a polygon. The input region with ID 3 (see FIG. 4) has four points. The input region on the GUI 28 thus describes an irregular quadrilateral, wherein the vertices of the quadrilateral have the coordinates (0;0), (0;20), (20;20) and (30;50).

Finally, in column 59, the process allocated to a particular input region is indicated. A plurality of input regions can be allocated to a process, which input regions may also lie at different actuation levels. The process ID given in column 59 allows the processor 22 to identify the process to which, for an input region affected by a user input, the user input is to be signaled.

The data structure 24*a* shown in FIG. 4 is continuously updated by the processor 22 during the running time of processes on the processor. When a new input region is opened by an allocated process, this new input region is newly registered in the data structure 24*a*. When an input region registered in the data structure 24*a* is closed by an allocated process (or when the allocated process is closed), the registered input region is erased from the data structure 24*a*.

Furthermore, the column entries 54, 56, 58 for individual input regions can change during the running time of processes. If, for example, a button of an input region in the form of an operating window fades into the background, then the parameter of the actuation level in column 54 is correspondingly changed to a lower-ranking value. If, for example, a hitherto non-blocking input region of a process is to block user inputs at lower-ranking actuation levels, then the blocking type of the corresponding input region is changed from 0 to 1 in column 56. If a triangular shape of an input region is to be changed to an octagonal shape, then three coordinate pairs of the triangular shape are replaced by eight coordinate points of the octagonal shape in column 58.

In a Cover Flow display, for example, input regions in the form of music album covers are positioned virtually in a row. A user is able to browse through the selection, whereby individual album covers perspectively come forward or are tipped backwards again. The size, shape and optionally actuation level and optionally blocking type of the particular input region thereby changes. These changes can be taken into account in the data structure 24*a* by means of real-time updating.

Figure 5:
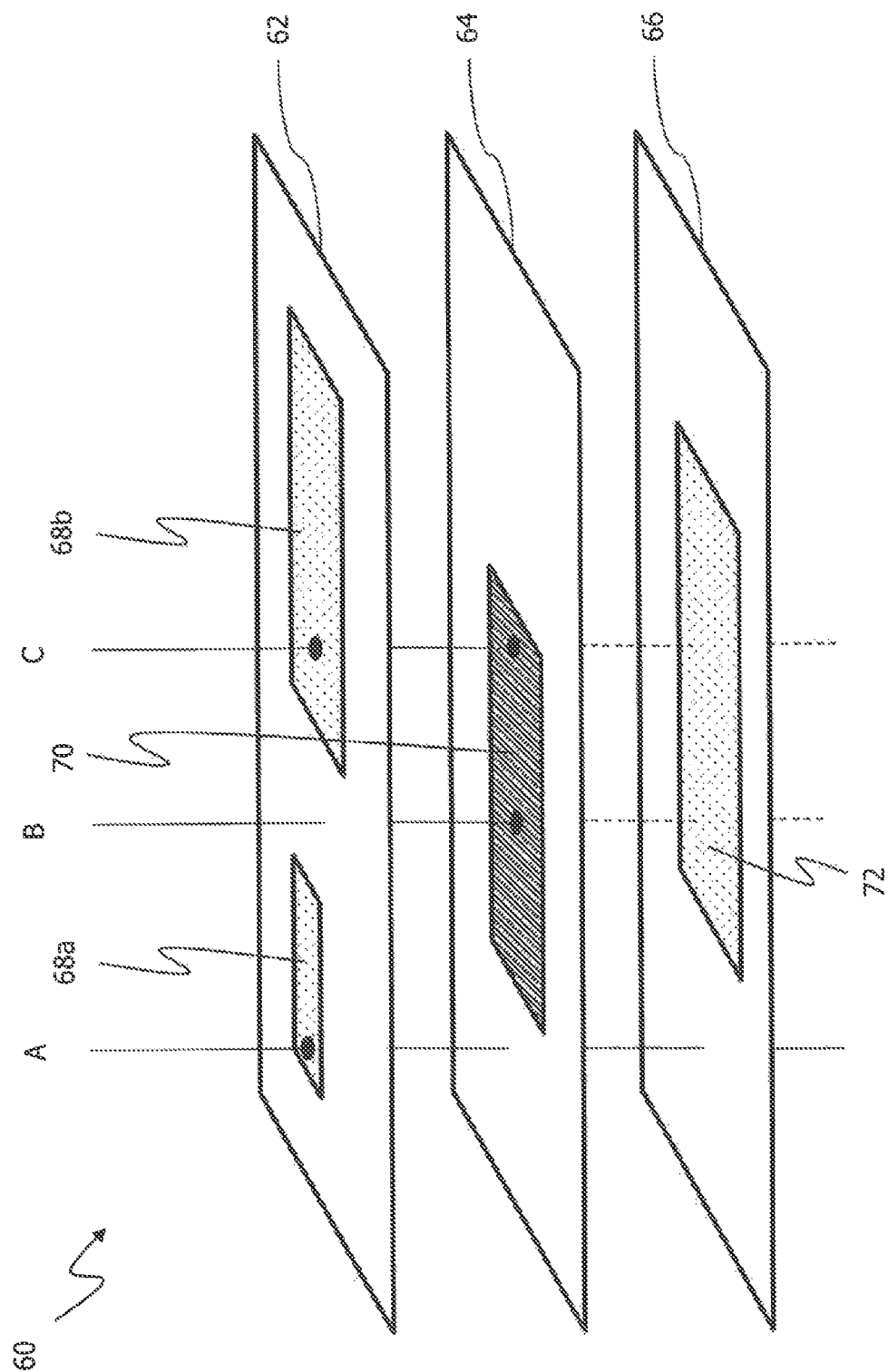
FIG. 5 is a schematic representation of input regions of a GUI at different logical actuation levels.
Figure 6:
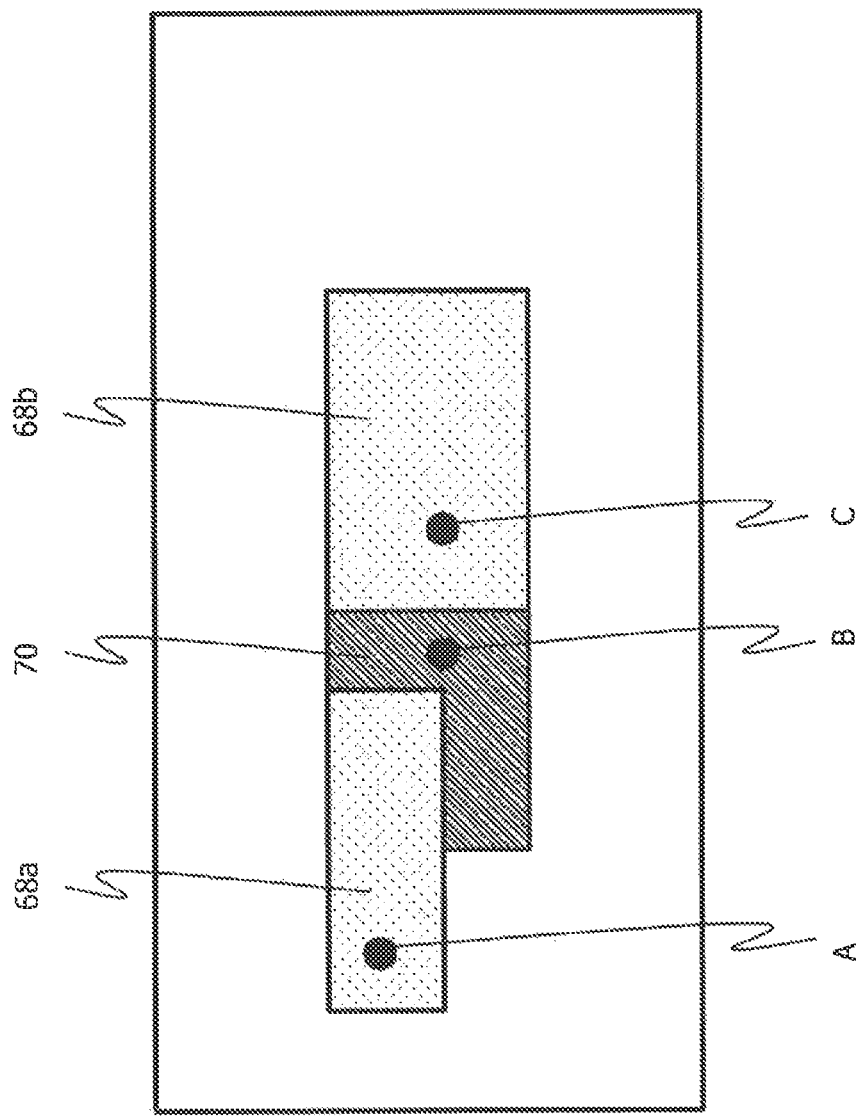
FIG. 6 is a view of the GUI according to FIG. 5.

FIG. 5 is a schematic representation of input regions of a GUI 28 at different logical actuation levels. FIG. 6 is a view of the GUI 28 according to FIG. 5.

In the exemplary embodiment, the GUI 28 comprises three actuation levels 62, 64 and 66 (see FIG. 5), wherein the logically uppermost actuation level 62 has the highest rank, the logically middle actuation level 64 has the second-highest rank, and the logically lowermost actuation level 66 has the third-highest rank. Each of the actuation levels 62, 64, 66 can correspond to a display level of the GUI 28 or can be a logical entity separate therefrom. There are further shown in FIGS. 5 and 6 three different user inputs A, B and C, which differ by their input positions.

The first actuation level 62 comprises a first input region 68*a* and a second input region 68*b*, both of which are rectangular in shape and whose blocking type is non-blocking. The second actuation level 64 comprises a third input region 70, which has a rectangular shape and whose blocking type is blocking. The third actuation level 66 comprises a fourth input region 72, which has a rectangular shape and whose blocking type is non-blocking.

When the user input A is evaluated, the input regions that contain the input position of the user input A are first determined. Of the four input regions 68a, 68b, 70, 72, only the first input region 68a contains the input position of the user input A. Sorting of the determined input regions thus gives only the highest-ranking input region 68a. The user input A is signaled to the process of input region 68a. The blocking type of input region 68a is then determined. Since the blocking type is non-blocking, it is checked whether further lower-ranking input regions could be determined. However, since no further determined input regions are present, the evaluation of the user input A is terminated.

When the user input B is evaluated, the input regions that contain the input position of the user input B are first determined. Of the four input regions 68a, 68b, 70, 72, the third input region 70 and the fourth input region 72 contain the input position of the user input B. Sorting of the determined input regions thus gives the highest-ranking input region 70 and the lower-ranking input region 72. The user input B is first signaled to the process of the highest-ranking input region 70. The blocking type of input region 70 is then determined. Since the blocking type is blocking, the evaluation of the user input B is then terminated. The user input B is not signaled to the process of the lower-ranking input region 72.

Input region 70 can be, for example, a button for confirming an error message. Since confirming is not to affect any other operating elements, input region 70 has blocking properties so that the user input B cannot be evaluated as an input by the lower-ranking input region 72 (e.g. a window of an Internet browser).

When the user input C is evaluated, the input regions that contain the input position of the user input C are again first determined. Of the four input regions 68a, 68b, 70, 72, the second input region 68b, the third input region 70 and the fourth input region 72 contain the input position of the user input C. Sorting of the determined input regions thus gives the highest-ranking input region 68b, the second-ranked input region 70 and the third-ranked input region 72.

The user input C is first signaled to the process of the highest-ranking input region 68b. The blocking type of input region 68b is then determined. Since the blocking type is non-blocking, the user input C is signaled to the process of the next-ranking input region, here the second-ranked input region 70. The blocking type of the second-ranked input region 70 is then determined. Since the blocking type is blocking, the evaluation of the user input C is then terminated. The user input C is thus not signaled to the process of the third-ranked input region 72.

The input region 70 can be, for example, a pick list of music titles. A window with a volume control is shown semi-transparently over the pick list. The user input C can be an input at a music title, the music title being covered by the volume control window. The input region 68b of the window has non-blocking properties, so that the user input C is nevertheless likewise evaluated by a pick list process (and e.g. can be evaluated as the selection of a music title, while a volume control process, on the other hand, discards the input because it could not be evaluated as volume control).

Figure 7:
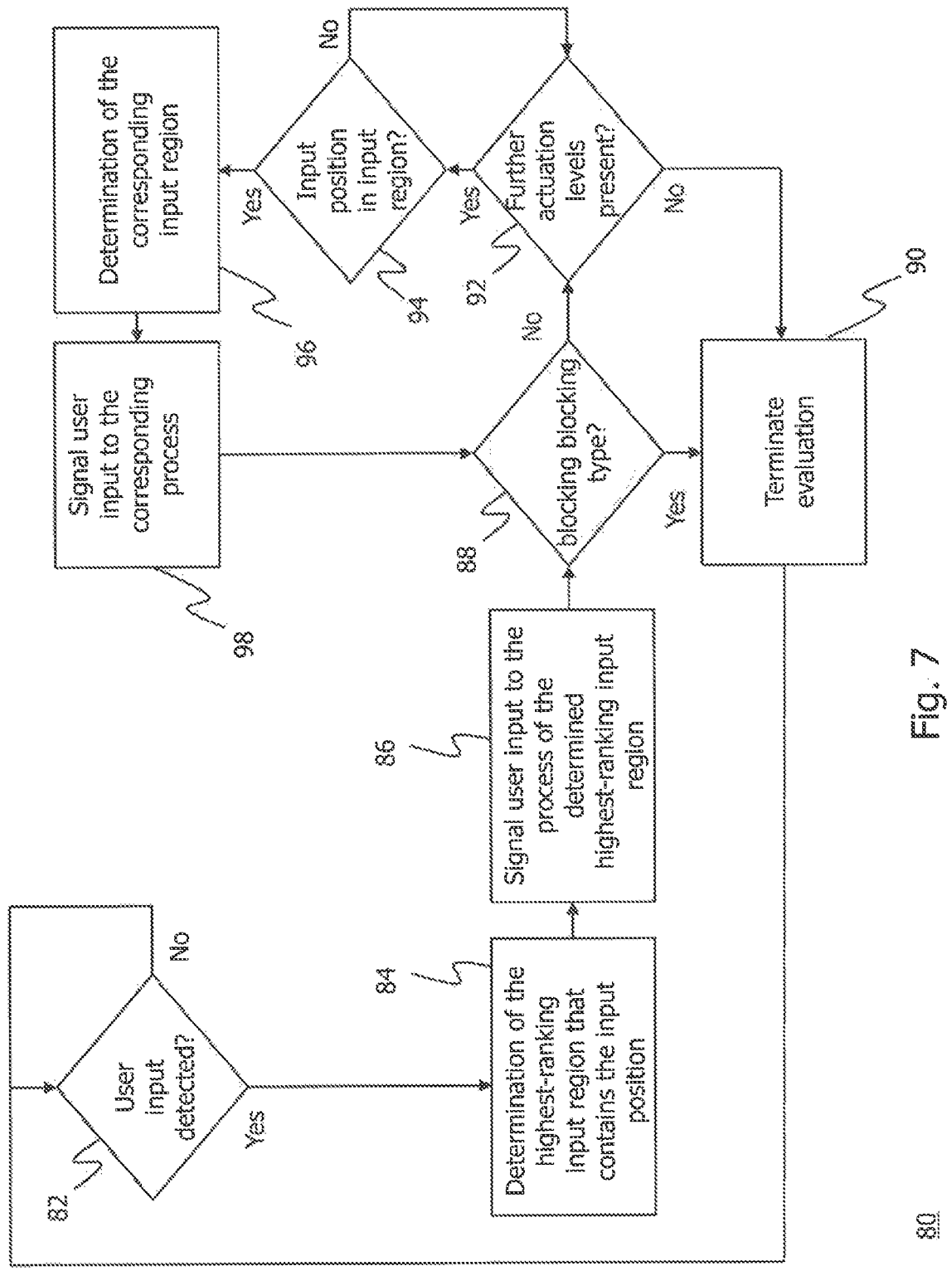
FIG. 7 is a flow diagram of a second exemplary embodiment of a method for determining input regions that are affected by a user input.

FIG. 7 shows a flow diagram of a second exemplary embodiment of a method 80 for determining input regions. The second exemplary embodiment differs from the first exemplary embodiment according to FIG. 3 substantially in that the determination of input regions that contain the input position is carried out in later steps.

In step 82, it is checked whether a user input is detected at the GUI 28. If a user input is detected, the user input is allocated an input position on the GUI 28. In step 84, the highest-ranking input region that contains the input position is determined. To that end, it is checked, in descending order of ranking on the basis of the data structure 24a, whether an actuation level has an input region that contains the input position. In step 86, the user input is signaled to the process of the determined highest-ranking input region. Then, in step 88, the allocated blocking type for the highest-ranking input region is evaluated. If the blocking type is blocking, the user input cannot be applied to lower actuation levels. In this case, the evaluation of the user input is terminated in step 90.

However, if the blocking type of the determined highest-ranking input region is non-blocking, then it is determined in step 92, on the basis of the data structure 24a, whether lower-ranking actuation levels are present. If such actuation levels are present, it is checked in step 94 whether an input region of such an actuation level contains the input position. If no input region of the actuation level comprises the input position, it is checked in step 92 whether a further lower-ranking actuation level is present, and in step 94 it is again checked whether an input region of such an actuation level comprises the input position. These two steps are repeated either until no lower-ranking actuation level is present and the evaluation is terminated in step 90, or until a lower-ranking actuation level is present that contains an input region that in turn contains the input position.

In the latter case, the input region of the actuation level that contains the input position is detected in step 96. In step 98, the user input is signaled to the process of the determined input region. Then, in step 88, the allocated blocking type for that input region is evaluated. If the blocking type is blocking, the user input cannot be applied to lower actuation levels. In this case, the evaluation of the user input is terminated in step 90. However, if the blocking type of the determined highest-ranking input region is non-blocking, then it is again determined in step 92 whether lower-ranking actuation levels are present.

As long as further lower-ranking actuation levels that contain input regions containing the input position and also whose blocking type is non-blocking are present, a loop comprising steps 92, 94, 96, 98 and 88 is continued. As soon as no further lower-ranking actuation levels are present and/or no such lower-ranking actuation levels that contain input regions containing the input position are present, and/or the blocking type of an input region is blocking, the loop and thus also the evaluation of the user input are terminated in step 90.

This exemplary embodiment has the advantage that lower-ranking actuation levels only have to be determined when it is found that the user input to be evaluated is not blocked by higher-ranking input regions.

FIG. 8 shows an inside view of a motor vehicle 100 having the device 20 presented herein for determining input regions. The device 20 has as the human-machine interface a touch-sensitive display unit 104. However, other human-machine interfaces, such as a tracking ball, a mouse or finger tracking by a camera, are also possible.

The device 20 is able to control a motor vehicle process 106. The motor vehicle process can be, for example, a function of a radio, of a navigation system, of an infotainment system or of a radio telephone.

If, for example, during operation of the device 20 a congestion warning is received, the user is required, in an input region in the form of a pop-up, to confirm the congestion warning. The input region of the congestion warning has the highest rank. Since the congestion warning is not related to the previously activated processes (e.g. a radio control panel), the corresponding input region blocks a user input for lower-ranking input regions (e.g. a volume controller in the radio control panel which is under the pop-up of the congestion warning).

Another example is a display of input regions which are allocated to a telephone process. Route guidance information of a navigation process is superimposed semi-transparently over the input regions of the telephone. The navigation process likewise has input regions whose rank is higher than the rank of the input regions of the telephone process. However, the blocking type of the input regions of the navigation process is non-blocking. A user is thus able, for example, to terminate a telephone conversation "through the route guidance" by means of a user input.

As is apparent from the preceding exemplary embodiments, the selective blocking approach proposed herein improves the controllability of the functionality in particular of overlapping input regions in connection with user inputs. In particular, it is not necessary that all processes with active input regions have a global knowledge of all other processes. Rather, a global data structure or similar central implementation allows the input regions affected by a user input (and the processes linked therewith) to be determined in a simple manner.

In the examples presented, different features of the present disclosure have been described separately from one another and in specific combinations. It will be appreciated, however, that many of these features can be freely combined with one another, where this is not explicitly excluded.

The invention claimed is:

1. A method for determining input regions that are affected by a user input at a graphical user interface, GUI, wherein for each input region the following are associated with one another:
   (i) an actuation level of the input region, wherein a plurality of actuation levels is defined in an order of ranking;
   (ii) an allocation of the input region to a region of the GUI; and
   (iii) a blocking type of the input region, which indicates whether a user input to a lower-ranking actuation level is blocked;
   wherein a process is allocated to each input region;
   wherein the method comprises:
      detecting a user input, wherein the user input is allocated an input position on the GUI;
      determining at least one input region that contains the input position;
      evaluating, at least for the highest-ranking determined input region, the blocking type allocated to that input region in order to determine whether the user input to at least one lower-ranking input region that contains the input position is blocked;
      signaling the user input at least to the process of the highest-ranking determined input region, wherein the process of the highest-ranking determined input region evaluates the user input signaled thereto and proceeds by discarding the user input or performing a particular action; and
      signaling the user input to the process of at least one lower-ranking determined input region for which the user input is not blocked by a higher-ranking determined input region, wherein the process of the at least one lower-ranking determined input region for which the user input is not blocked by a higher-ranking determined input region evaluates the user input signaled thereto and proceeds by discarding the user input or performing a particular action;
   wherein the actuation level represents a logical entity separate from the display level of the GUI.

2. The method according to claim 1, wherein
   a first input region and a lower-ranking second input region overlap at least partially and the input position is in the overlapping region.

3. The method according to claim 1, wherein
   a first input region and a lower-ranking second input region overlap at least partially and the input position is in the overlapping region,
   wherein owing to the blocking type of the first input region, the user input to the lower-ranking actuation level is not blocked, wherein the user input is signaled to the processes that are allocated to the first input region and the second input region.

4. The method according to in claim 1, wherein
   a first input region and a lower-ranking second input region overlap at least partially and the input position is in the overlapping region,
   wherein owing to the blocking type of the first input region, the user input to the lower-ranking actuation level is blocked, wherein the user input is signaled to the process that is allocated to the first input region and is not signaled to the process that is allocated to the second input region.

5. The method according to claim 1, wherein a first input region is displayed semi-transparently over a second input region.

6. The method according to claim 1, wherein the user input is detected on a touch-sensitive surface.

7. The method according to claim 1, wherein the user input is detected by means of gesture recognition.

8. The method according to claim 1, wherein each input region is defined by coordinates which can clearly be allocated to coordinates of the GUI.

9. The method according to claim 1, wherein in the steps of determining and/or evaluating there is a data structure used which, for each input region, associates each of the actuation level, the allocation to a GUI region and the blocking type of the input region with one another, wherein the data structure is continuously updated during a running time of a particular process.

10. The method according to claim 9, wherein the data structure is in the form of a table, wherein a row of the table is allocated to each input region, and the table contains a column for each of the actuation level, the allocation to a GUI region and the blocking type.

11. The method according to claim 9, wherein the data structure is in the form of a table, wherein a row of the table is allocated to each input region, and the table contains a column for each of the actuation level, the allocation to a GUI region and the blocking type, wherein the data structure is continuously updated in that
    when a new input region is opened by an allocated process, the new input region is newly registered in the data structure; and/or
    when an input region registered in the data structure is closed by an allocated process or the allocated process is closed, the registered input region is erased from the data structure.

12. A computer program product with program code for carrying out the method according to claim 1 when the program code is executed on a processor.

13. The computer program product according to claim 12, stored on a storage medium that is readable by the processor.

14. The method according to claim 1, wherein the actuation level of a given input region changes during the running time.

15. The method according to claim 1, wherein the size, shape, and blocking type are updated in the data structure in real time.

16. A device for determining input regions that are affected by a user input at a graphical user interface, GUI, wherein for each input region the following are associated with one another:
   (i) an actuation level of the input region, wherein a plurality of actuation levels is defined in an order of ranking;
   (ii) an allocation of the input region to a region of the GUI; and
   (iii) a blocking type of the input region, which indicates whether a user input to a lower-ranking actuation level is blocked;
   wherein a process is allocated to each input region;
   wherein the device comprises a processor which is adapted:
      to detect a user input, wherein the user input is allocated an input position on the GUI;
      to determine at least one input region that contains the input position; and
      to evaluate, at least for the highest-ranking determined input region, the blocking type allocated to that input region in order to determine whether the user input to at least one lower-ranking input region that contains the input position is blocked;
      to signal the user input at least to the process of the highest-ranking determined input region, wherein the process of the highest-ranking determined input region evaluates the user input signaled thereto and proceeds by discarding the user input or performing a particular action; and
      to signal the user input to the process of at least one lower-ranking determined input region for which the user input is not blocked by a higher-ranking determined input region, wherein the process of the at least one lower-ranking determined input region for which the user input is not blocked by a higher-ranking determined input region evaluates the user input signaled thereto and proceeds by discarding the user input or performing a particular action,
   wherein the actuation level represents a logical entity separate from the display level of the GUI.

17. The device according to claim 16, further comprising a display unit which is adapted to display the GUI; and
   a human-machine interface which is adapted to generate the user input.

18. The device according to claim 16, wherein the actuation level of a given input region changes during the running time.

19. The device according to claim 16, wherein the size, shape, and blocking type are updated in the data structure in real time.

* * * * *